United States Patent [19]

Takahama et al.

[11] Patent Number: 5,430,479
[45] Date of Patent: Jul. 4, 1995

[54] MOVING VECTOR EXTRACTOR

[75] Inventors: Kengo Takahama; Yasukuni Yamane, both of Osaka, Japan

[73] Assignees: Sharp Corporation, Osaka; Ezel Inc., Tokyo, both of Japan

[21] Appl. No.: 776,069

[22] Filed: Oct. 16, 1991

[30] Foreign Application Priority Data

Oct. 16, 1990 [JP] Japan ................ 2-275408

[51] Int. Cl.⁶ ............................................. H04N 7/18
[52] U.S. Cl. .................................... 348/208; 348/416
[58] Field of Search ............... 358/105, 133, 136, 141, 358/209, 225, 227, 229; 382/1; 348/400, 669, 416, 208

[56] References Cited

U.S. PATENT DOCUMENTS

| | | | |
|---|---|---|---|
| 5,019,901 | 5/1991 | Uomori et al. | 358/105 |
| 5,030,984 | 7/1991 | Buckler et al. | 358/105 |
| 5,099,323 | 3/1992 | Morimura et al. | 358/105 |
| 5,101,278 | 3/1992 | Itsumi et al. | 358/225 |
| 5,111,511 | 5/1992 | Ishii et al. | 358/105 |

FOREIGN PATENT DOCUMENTS

| | | | |
|---|---|---|---|
| 0095560 | 12/1983 | European Pat. Off. | H04N 7/13 |
| 0206668 | 12/1986 | European Pat. Off. | H04N 5/225 |
| 0312780 | 4/1989 | European Pat. Off. | H04N 5/225 |

OTHER PUBLICATIONS

Chaudhuri et al., "The Equivalence of Best Plane Fit Gradient with Robert's, Prewitt's and Sobel's Gradient for Edge Detection and a 4–Neighbour Gradient with Useful Properties", Signal Processing, 1984, pp. 143–151 Patent Abstracts of Japan, vol. 010, No. 137.
Morimura et al., "Automatic Images Stabilizing System by Video Signal Processing", The Journal of Institute of Television Engineers of Japan, 1991, pp. 43–48.
Ninomiya et al., "A Motion Vector Detector for MUSE Encoder", The Journal of Institute of Television Engineers of Japan, 1985, pp. 25–30.

Primary Examiner—James J. Groody
Assistant Examiner—Glenton B. Burgess
Attorney, Agent, or Firm—Cushman, Darby & Cushman

[57] ABSTRACT

A moving vector extractor for detecting a shaking of an image through a video camera in order to improve accuracy of the detection. Even when the image is dark or of low density gradient as a whole, a density gradient value around representative point is calculated. Basic data of moving vector of the difference value between successive frames is obtained by calculating an absolute value or a squared value. The basic data of the moving vector is weighted according to a density gradient value so as to improve the precision of moving vector extraction.

34 Claims, 11 Drawing Sheets

MOVING VECTOR EXTRACTOR

FIELD OF THE INVENTION

This invention is related to the extraction technology of a moving vector from an image signal for preventing a videotape recorder, with a camera incorporated therein, from shaking.

BACKGROUND OF THE INVENTION

Conventionally, there are various methods for the extraction of moving vectors for indicating the direction and speed of movement of an image. The direction and speed is calculated by dividing a given image into blocks of a predetermined size and by calculating a moving vector according to the relationship between successive image frames for each block. Such methods include a gradient method concerning spatial and time gradient of brightness, a phase correlation method in which phase terms ratio of coefficients of Fourier transformation is used, and a representative point matching method in which the accumulated value of the absolute value of differences between frames at representative points in successive images is used. The "representative point matching method" used in a MUSE encoder is advantageous because the size of hardware is smaller than that for the other above-mentioned methods.

For a representative point matching method, for example, a frame image may be divided into four blocks, as shown in FIG. 2, and a moving vector of one of those blocks is calculated. First, a number of representative points, equal to $b \times c = P$, are. The absolute value of the difference between frames is generated by the following formula, using multi-values in a searching area of m pixels $\times$ n pixels.

$$P_{d,e}(i,j) = |a^n{}_{d,e}(i,j) - a^{n-1}{}_{d,e}(0,0)|$$

where $a^n{}_{d,e}(i,j)$ is a current image frame and $a^{n-1}{}_{d,e}(0,0)$ is a previous image frame. For each representative point, the sum of the accumulated value of $P_{d,e}(i, j)$ is calculated by a following formula $$P(i,j) = \sum_e \sum_d P_{d,e}(i,j),$$

and the displacement value (i, j) that has the minimum value is considered as a moving vector. This is the representative matching method. FIG. 15 describes the concept. As will be understood from this figure, by calculating the absolute value of the difference between frames (mark I), a data for the absolute value of the difference including a curved line K whose value is 0 (mark J) will be obtained. By accumulating this data for the absolute value of the difference for each representative point, the accumulated value at the intersection of the curved line K will be the minimum value, and this is the position of the moving vector M. The accumulation function P(i, j) will be a funnel-like concavity centering the moving vector position (i, j).

SUMMARY OF THE INVENTION

A disadvantage to the above method is that the extraction of a moving vector is greatly influenced from noises in the successive frames when the input image is low in brightness or density gradient as a whole, thereby causing errors. The absolute value of the difference with respect to a representative point includes little information of movement at a position with low density gradient. The moving vector calculated appears in the total searching area due to random noises as shown in FIG. 4. The calculation precision is extremely low.

It is therefore an object of the present invention to improve the precision of moving vector extraction by weighting a basic data of a moving vector according to the density gradient value.

According to the present invention, moving a vector extractor comprises a means for obtaining the difference value between successive frames with a predetermined time distance for representative points, in a predetermined area, a means for calculating a density gradient value around a representative point, a means for obtaining a basic data of moving vector for the difference value between frames by calculating an absolute value or a squared value, a means for weighting basic data of moving vector according to density gradient value, a means for extracting moving vector, through calculation of accumulation addition of a basic data of weighted moving vector for each representative point, and calculation of a local minimum of the accumulating addition.

PREFERRED EMBODIMENT OF THE PRESENT INVENTION

Figure 2:
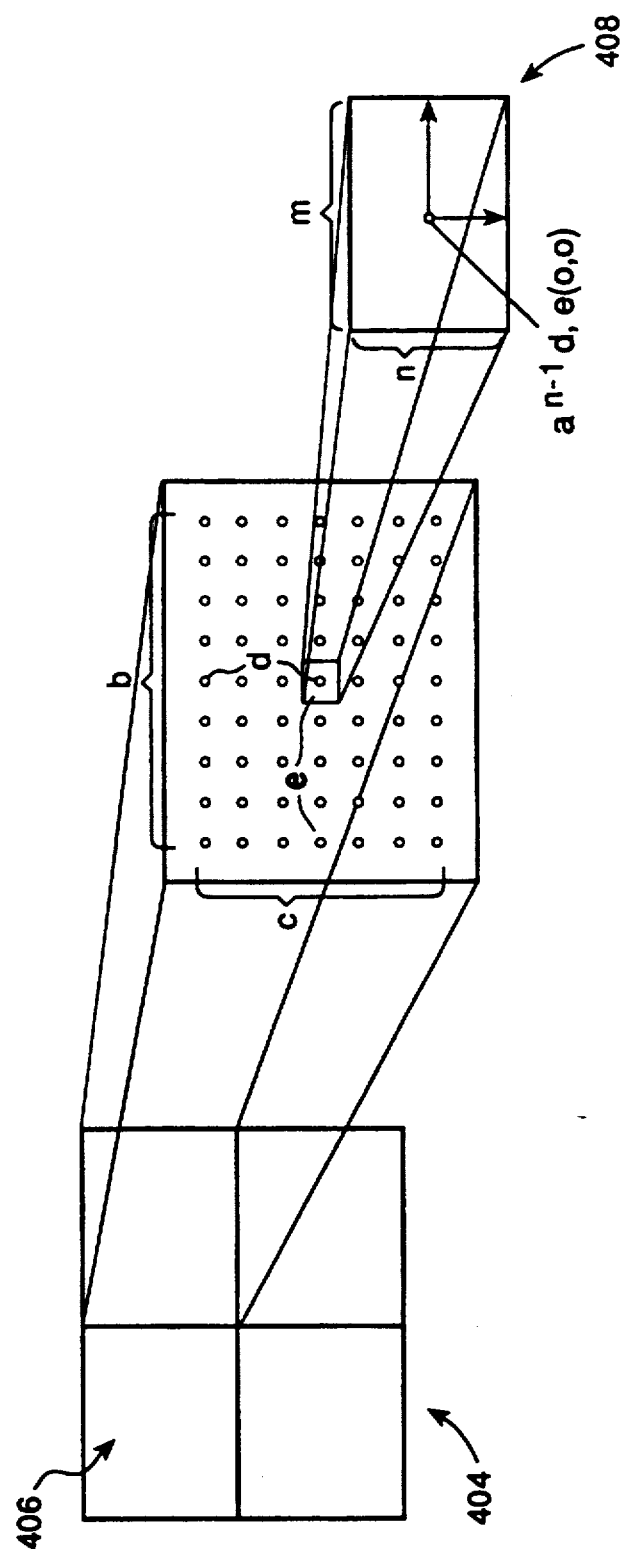
FIG. 2 shows a position of a representative point.

Hereinafter, the first embodiment of the present invention will be described with referring to the attached drawings. As shown in FIG. 2, a frame image 404 is divided into subblocks 406 representative points aligned on b columns in the horizontal direction and on c lines in the vertical direction of a subblock 406 are selected, so that a rectangular block 408 in subblock 406 is defined by each representative point centered in the rectangular block 408. The block is a searching area of m pixels in the horizontal direction and n pixels in the vertical direction. The brightness of each representative point in the previous field is stored in a memory. The brightness of a representative point on a dth column and the row in a previous field is denoted here as $a^{n-1}{}_{d,e}(0,0)$. When the brightness of pixels around the representative point in the current field is $a^{n-}{}_{d,e}(i, j)$, the absolute value of the difference value $P_{d,e}(i, j)$ is calculated as below.

$$P_{d,e}(i, j) = |a^n{}_{d,e}(i, j) - a^{n-1}{}_{d,e}(0, 0)| \qquad (1)$$

Figure 3:
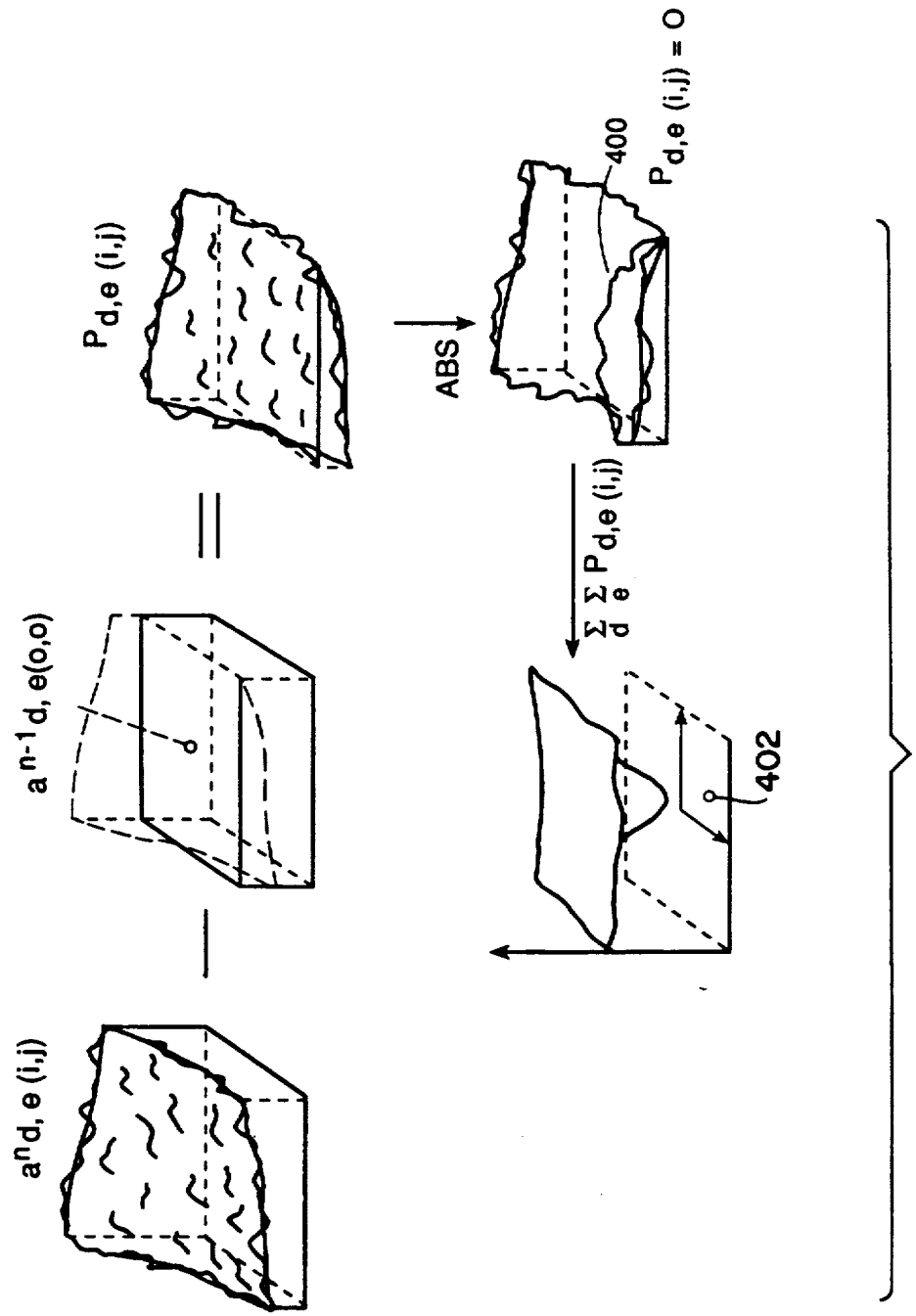
FIG. 3 and 4 show a concept of representative point matching method used for an image with noises.

FIG. 3 illustratively shows the above concept when a density gradient around a representative point is large. Points (i, j) satisfying $P_{d,e}(i, j) = 0$ are candidates for the moving vector 402 for point (i, j). These joints generally define a curved line 400.

Figure 4:
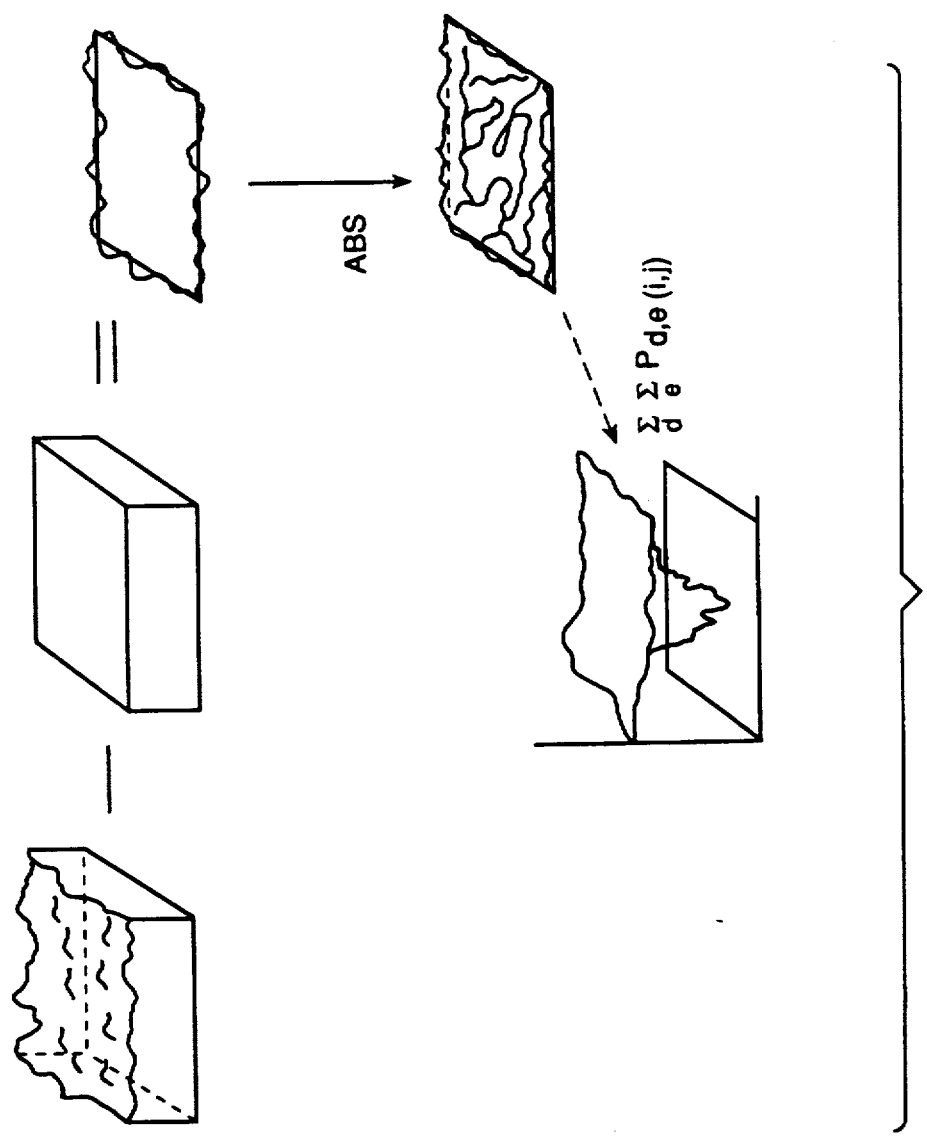

However, when a density gradient around a representative point is small and random noises of two field images are added, point (i, j) satisfying $P_{d,e}(i, j) = 0$ becomes uncertain, as shown in FIG. 4, and when specially density gradient value = 0, points (i, j) satisfying $P_{d,e}(i, j) = 0$ may exist all over the searching area of m×n pixels. Because of this, the accumulation result $P_{d,e}(i, j)$ will be greatly influenced by the point P (i, j) in successive images. Where, $$P(i, j) = \sum_e \sum_d P_{d,e}(i, j). \qquad (2)$$

Therefore, the precision of extraction of $$\text{moving vector} = (i, j) | P(i, j) = \min \qquad (3)$$

becomes low. For solving this problem, a means for extracting the average value of a density gradient around representative point is provided. Accordingly, an absolute value or square value of the difference is multiplied by a weight corresponding to the density gradient for each representative point; so that errors due to noises are decreased.

In the present embodiment, when a density gradient value is less than density gradient threshold B, weight is determined to be 0, and when a density gradient value is equal to or more than a density gradient threshold B, weight is determined to be 1. This is described as follows;

When a density gradient < B, $$P_{d,e}(i, j) = 0,$$

When a density gradient $\geq$ B, $$P_{d,e}(i, j) \neq |a^n{}_{d,e}(i, j) - a_{d,e}{}^{n-1}(0, 0)|. \qquad (4)$$

Figure 1:
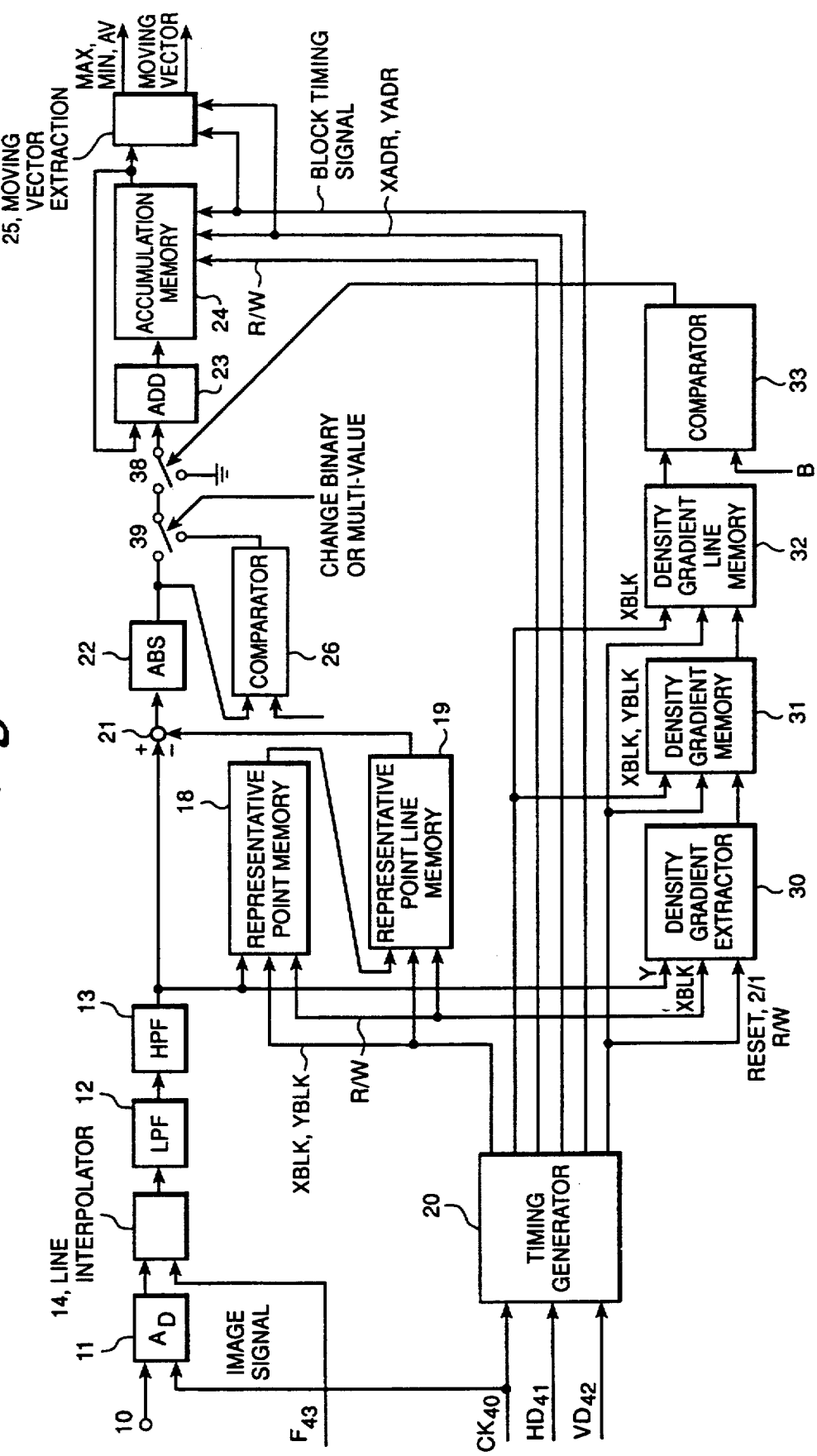
FIG. 1 shows a block diagram of the first embodiment of the present invention.

FIG. 1 shows a block diagram of the moving vector extractor.

In FIG. 1, an input terminal 10, to which an image signal is provided, is connected with a + input terminal of a subtracter 21 through, an A/D convertor 11, line interpolator 14, low band pass filter 12 for reducing influence from noise and high band pass filter 13 for reducing influence from the change of brightness over the whole image.

A representative memory 18 for extracting and storing a representative point from the current field signal is connected with the subtracter 21 through a representative memory 19 for extracting representative point on the previous field. Subtracter 21 cooperates with an absolute value calculator 22 for calculation of correlation between two fields. The absolute value calculator 22 is connected with comparator 26 for binarization. Absolute value calculator 22 and comparator 26 are connected with adder 23 through a mode switch 39 and a weighting switch 38. The mode switch 39 is for selecting binary or multi-value mode while the weighting switch 38 is for weighting alternatively by 0 or 1 according to density gradient value. Adder 23 is connected with an accumulation memory 24 so that accumulating addition of $P_{d,e}(i, j)$ is calculated. Accumulation memory 24 is connected with an extractor 25 for extracting moving vector. A density gradient extractor 30 for calculating the average density gradient value around a representative point in the current field is connected with a density gradient line memory 32 for outputting density gradient value of the previous field through a density gradient memory 31. Density gradient line memory 32 is connected with a comparator 33 for comparing density gradient of the previous field with threshold B. Comparator 33 is connected with weighting the switch 38 which is controlled according to the output from comparator 33. Clocks CK, horizontal synchronous signals HD and vertical synchronous signals VD are inputted to a timing generator 20 from outside, so that the generator counts these signals so as to generate control signals A/D convertor 11, representative memories 18 and 19, accumulation memory 24, extractor 25, density gradient extractor 30, density gradient memory 31 and density gradient line memory 32.

Figure 5:
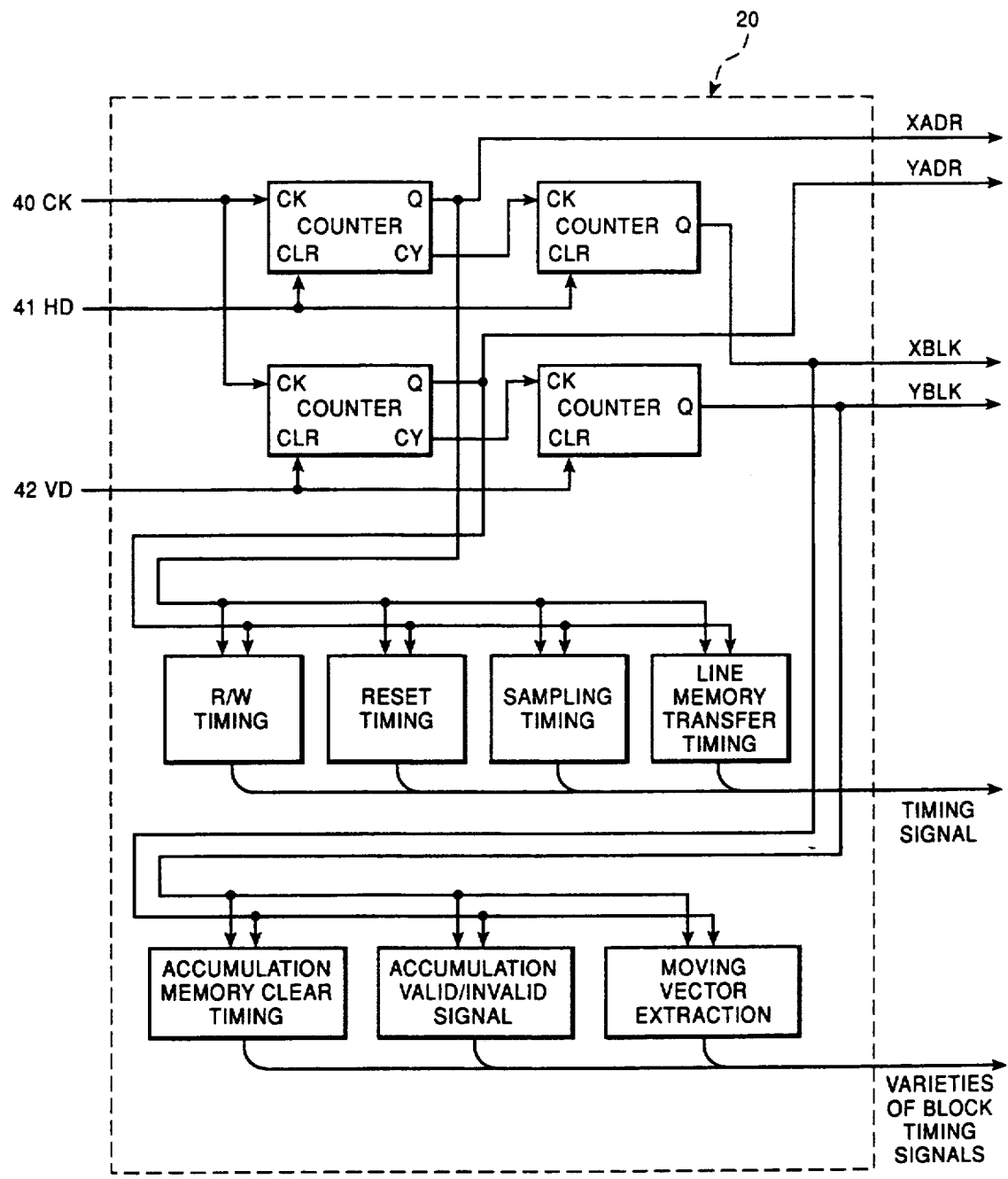
FIG. 5 is a detailed block diagram of a timing generator in FIG. 3.

Timing generator in a block diagram of FIG. 1 is explained in details referring to FIG. 5. Clock signals CK 40 as a reference signal, horizontal synchronous signals HD 41 and vertical synchronous signals VD 42 generated by dividing clock signals are inputted to the timing generator 20.

In timing generator 20, horizontal synchronous signals HD 41 is used as a reset signals and clocks CK is counted so that an address XADR in a horizontal direction is generated in the searching area, and a carry of the counted value is counted so that a block address XBLK is generated in the horizontal direction. Similarly, vertical synchronous signals VD is used as a reset signals and horizontal synchronous signal is counted so that an address YADR is generated in the horizontal direction in the searching area, and a carry of the counted value is counted so that a block address YBLK is generated in the vertical direction. Among these generated address signals, address XADR and YADR in the searching area are used for generating a timing signal for read/write of a representative point, a sampling timing of density gradient around representative point for calculating density gradient, a reset timing for memory and a transfer timing to a line memory.

Figure 6:
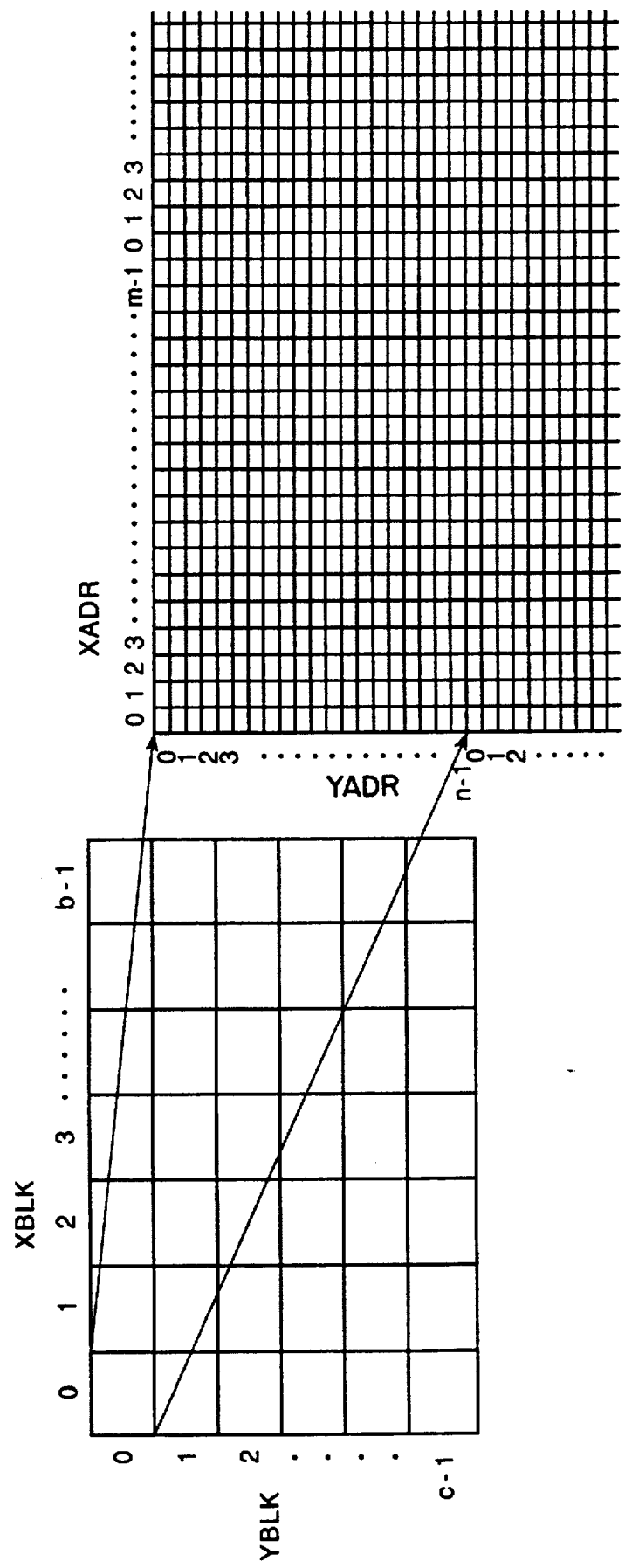
FIG. 6 shows an address mapping.

FIG. 6 shows address mapping of XADR, YADR, XBLK and YBLK.

Figure 7:
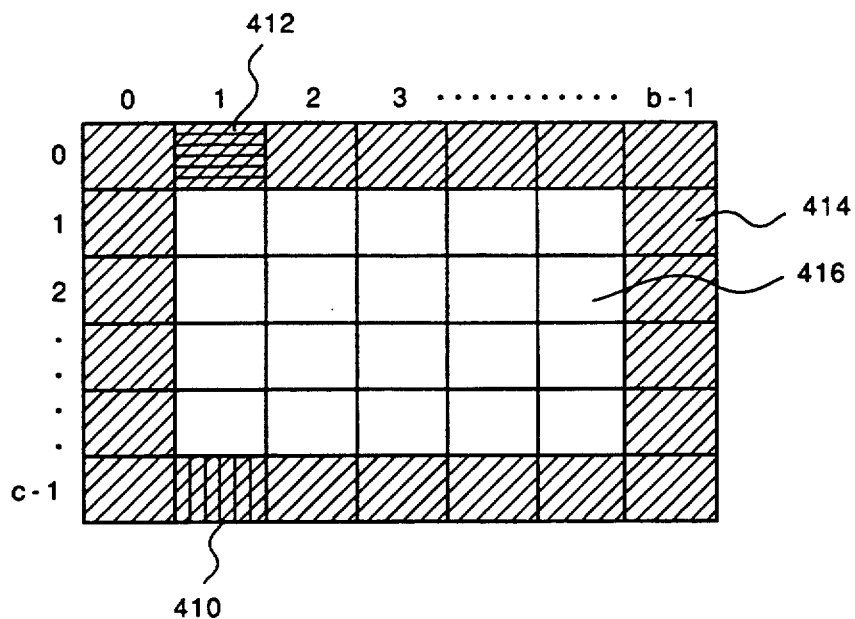
FIG. 7 and 8 show various block timings.

FIG. 7 shows varieties of block timing.

In FIG. 7, portions hatched with horizontal lines 412 represent blocks for clearing the contents of an accumulation memory, and portions hatched with diagonal lines only 414 represent invalid blocks and for not accumulating an accumulation memory. On the other hand, white-painted portions 416 represent valid blocks for accumulating an accumulation memory. Portions hatched with vertical lines 410 represent moving vector extraction blocks which give timing for moving vector extraction from the accumulated data in the above blocks.

Figure 8:
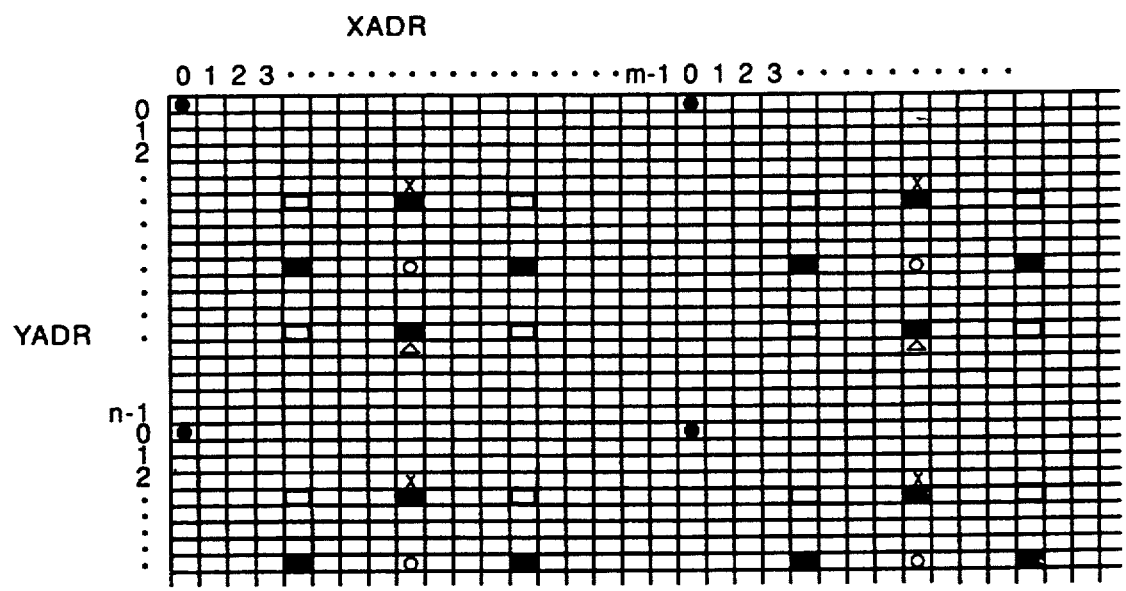

FIG. 8 shows timing for read/write, reset and multiplication of x1/x2 that are generated from XADR and YADR. A more detailed description appears below.

Figure 9A:
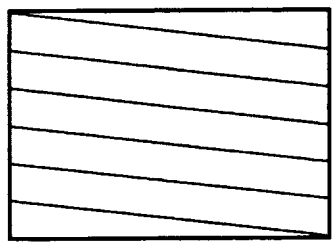
FIGS. 9a, 9b and 9c show a concept of interpolation of lines in a field image.
Figure 9B:
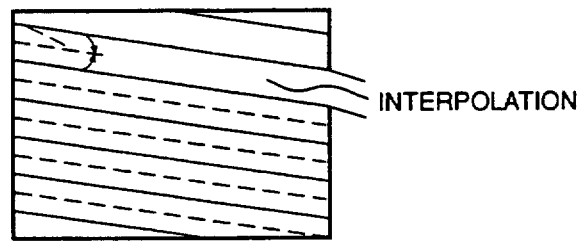
Figure 9C:
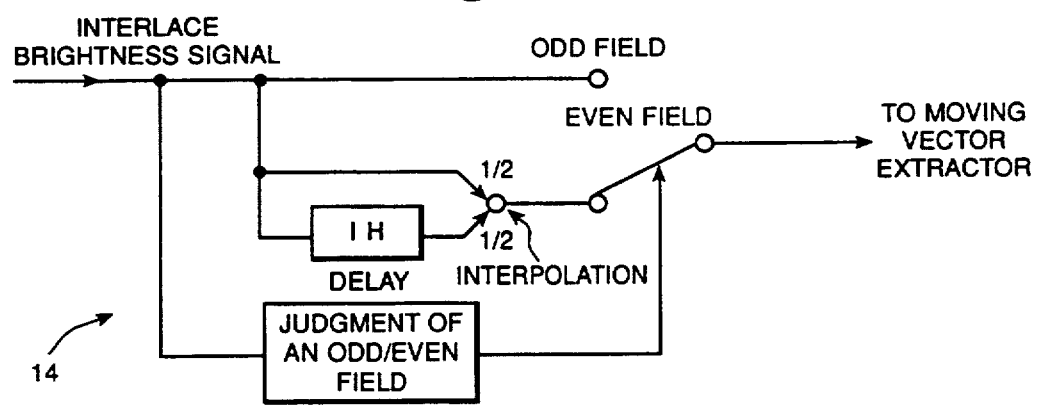

In FIG. 1, the operation manner will be explained. First, analog image signals inputted from image input terminal 10 are quantized into 8 bits in A/D convertor 11, and since each field line of one of even and odd field image displaces from the field line of the other by a half of distance between successive field lines, interpolated lines between successive field lines are to be generated in one of odd or even field. In line interpolator 14 shown in FIG. 9c, interpolation is performed for only one of even or odd field, where FIG. 9a shows an odd field image and FIG. 9b shows an even field image being interpolated. A judgment signal of odd/even field is given to the interpolator from outside for determining whether the interpolation is necessary or not. Unnecessary noises are temporally removed by low pass filter 12 and high pass filter 13, and outputted as brightness $a^n{}_{d,e}(i, j)$. Image signals whose noises are removed are stored in representative memory 18 as representative point $a^n{}_{d,e}(0, 0)$ of a current frame at the timing generated by timing generator 20. The brightness of this representative point is transferred to representative memory 19 during the next vertical synchronous term, and outputted to subtracter 21 as representative point $a^{n-1}{}_{d,e}(0, 0)$ of a previous frame. At this moment, addressing of representative memory 18 and 19, and read/write indication are operated by timing generator 20. As explained above, brightness signal $a^n{}_{d,e}(i, j)$ and $a^{n-1}{}_{d,e}(0, 0)$ are inputted into subtracter 21, and the difference is calculated. Then the absolute value of the difference $$P_{d,e}(i, j) = |a^n{}_{d,e}(i, j) - a^{n-1}{}_{d,e}(0, 0)|$$

is calculated by absolute value system 22 in the next step. This signal is accumulated in accumulation memory 24 by adder 23, through weighting switch 38.

From the output signal of high band pass filter 13 $a^n{}_{d,e}(i, j)$, the density gradients in horizontal and vertical directions are calculated independently from each other in density gradient extraction circuit 30 so that the density gradient is finally calculated. In this embodiment, the density gradient is calculated by the Sobel operator as shown in the formula below.

Figure 10A:
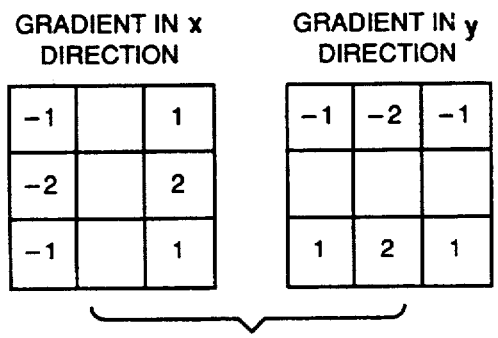
FIGS. 10a and 10b show an example of coefficients of an operator for calculating density gradient.
Figure 10B:
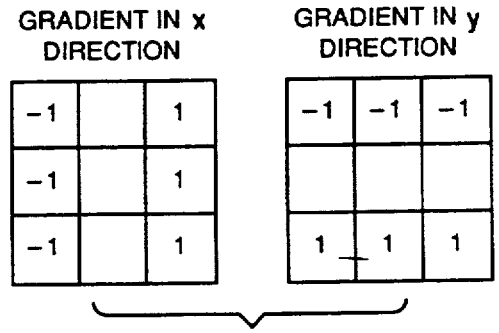

Density gradient in horizontal direction $DX =$
$\{|a^{n-1}_{d,e}(-hx, -hy) + 2a^{n-1}_{d,e}(-hx, 0) + a^{n-1}_{d,e}(-hx, -hy) - a^{n-1}_{d,e}(hx, -hy) - 2a^{n-1}_{d,e}(hx, 0) - a^{n-1}_{d,e}(hx, hy)|\}$ Density gradient in vertical direction $DY =$
$\{|a^{n-1}_{d,e}(-hx, -hy) + 2a^{n-1}_{d,e}(0, -hy) + a^{n-1}_{d,e}(hx, -hy) - a^{n-1}_{d,e}(-hx, hy) - 2a^{n-1}_{d,e}(0, hy) - a^{n-1}_{d,e}(hx, hy)|\}$ Density gradient $DV = DX + DY$
and
$DV = SQR(DX \times DX + DY \times DY)$ may be used. Instead of the Sobel operator, the Prewitt operator or the Roberts operator may be used. FIG. 10a shows examples of coefficients of the Sobel operator and the FIG. 10b shows examples of coefficients of the Prewitt operator, with both figures showing gradients in the x and y directions.

Figure 11:
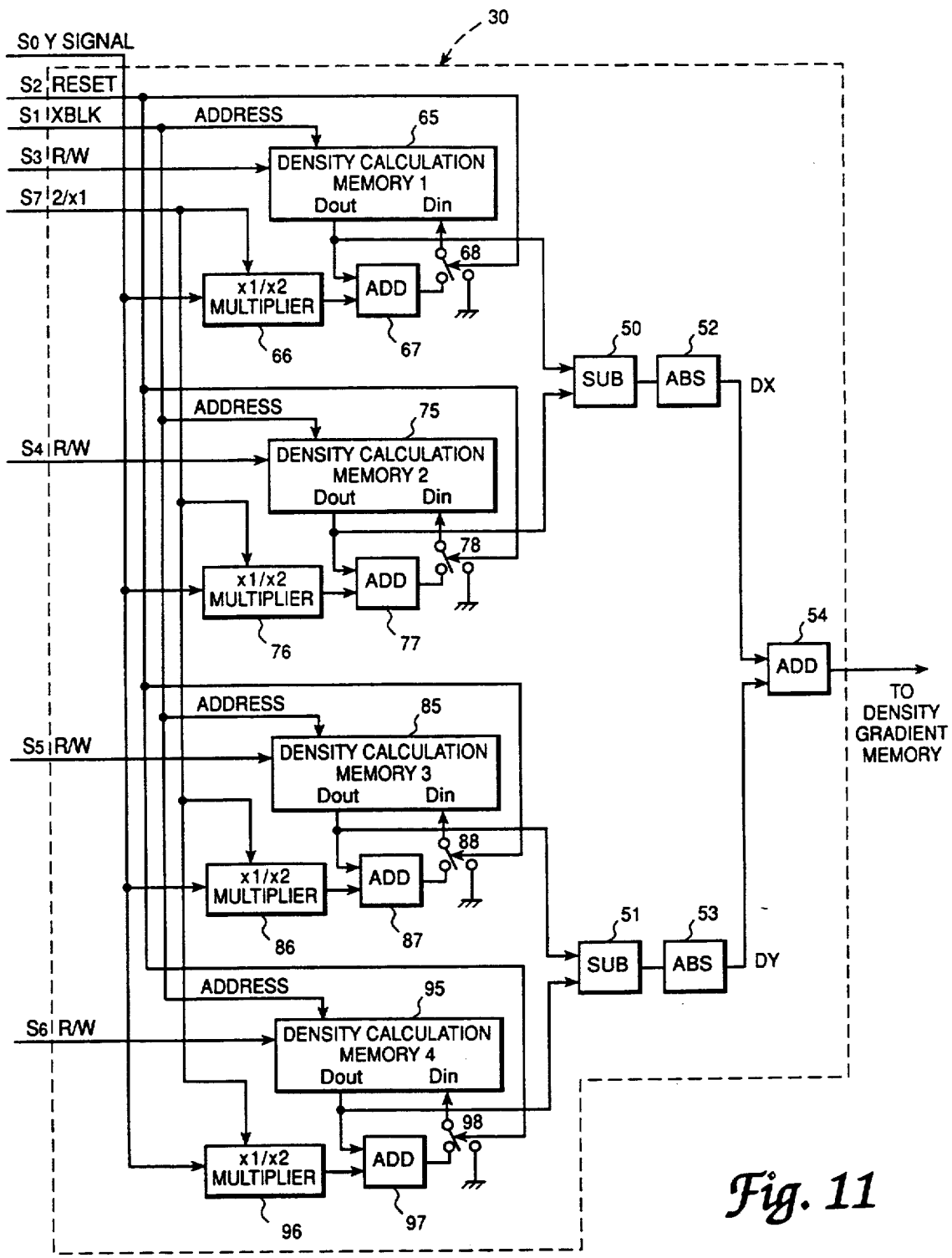
FIG. 11 is a detailed block diagram of density gradient extractor.

Density gradient extractor 30 is explained in detail in FIG. 11. $S_0$ is a filtered image signal outputted from high band pass filter 13, S1 is a block address signal in horizontal direction generated in timing generator 20, $S_3$, $S_4$, $S_5$, and $S_6$ are read/write signals generated in timing generator 20 for giving sampling timing, $S_7$ is an indicating signal generated in 66, 76, 86 and 96 are multipliers of x2 or x1, 67, 77, 87 and 97 are adders, 65, 75, 85 and 95 are line memories with a capacity for storing blocks in horizontal direction. The capacity of the embodiment in FIG. 2 is $b \times (a+2$ bits) and $S_2$ is a reset timing signal generated by timing generator 20 from column address in horizontal direction and row address in vertical direction.

FIG. 8 shows reset timing, sample timing around representative points and transfer timing to density gradient line memory 32. These timings are generated in the above timing generator 20 according to the address in horizontal direction XADR and the address in vertical direction YADR. The symbol o corresponds to a representative point sample timing. Symbol □ corresponds to a sample point for density gradient calculation. Symbol □ means multiplied by "1" and symbol means multiplied by "2". Symbol x corresponds to memory reset timing for density gradient calculation. Symbol Δ corresponds to transfer timing to a density gradient calculation memory 31. Symbol corresponds to transfer timing from representative point memory to representative point line memory, as well as transfer timing from density gradient to density gradient line memory.

In line memory 65 of FIG. 11, multiplier 66, adder 67 and switch 68, a calculation is operated according to the formula below;

$$a^{n-1}{}_{d,e}(-hx, -hy) + 2 \times a^{n-n}{}_{d,e}(-hx, 0) + a^{n-1}{}_{d,e}(-hx, hy),$$

in line memory 75, multiplier 76, adder 77 and switch 78, a calculation is operated according to the formula below;

$$a^{n-1}{}_{d,e}(hx, -hy) + 2 \times a^{n-n}{}_{d,e}(hx, 0) + a^{n-1}{}_{d,e}(hx, hy),$$

in line memory 85, multiplier 86, adder 87 and switch 88, a calculation is operated according to the formula below;

$$a^{n-1}{}_{d,e}(-hx, -hy) + 2 \times a^{n-1}{}_{d,e}(0, -hy) + a^{n-1}{}_{d,e}(hx, -hy),$$

in line memory 95, multiplier 96, adder 97 and switch 98, a calculation is operated according to the formula below;

$$a^{n-1}{}_{d,e}(-hx, hy) + 2 \times a^{n-1}{}_{d,e}(0, hy) + a^{n-1}{}_{d,e}(hx, hy).$$

After these calculations, the results are stored in density gradient calculation memories corresponding to the block addresses. Density gradient DX in the x direction is calculated by subtracter 50 and absolute value calculator 52 from an absolute value of the difference of the data in calculation memory 65 and 75, and density gradient in the direction is calculated by subtracter 51 and absolute value calculator 53 from the an absolute value of the data in calculation memory 85 and 95. A density gradient value around a representative point is calculated by adder 54 and outputted from $DV = DX + DY$.

Density gradient extracted by density gradient extractor 30 is stored in density gradient memory 31 according to a block address generated in the timing generator. However, when the density gradient value of the current field is written in a memory, the density gradient value of the previous field will be lost. Therefore, before the density gradient value of the current field is stored in the memory 31, density gradient value of the previous field needs to be transferred to density gradient line memory 32 and inputted to comparator 33 in the next step. In comparator 33, when the density gradient value is equal to or more than a predetermined threshold B, it will be outputted as 1. Output of comparator 33 is used for controlling switch 38, and when the output from comparator 33 is 1, output from absolute value calculator 22 is transmitted to the input of adder 23, and $P_{d,e}(i, j)$ is accumulated in accumulation memory 24. Contrary to this, when density gradient value is smaller than the threshold B, the output from comparator 33 will be 0, and switch 38 is connected to the ground terminal, and $P_{d,e}(i, j)$ is not accumulated.

This series of calculation processing with respect to an image for one field is completed, $P^n(i, j)$ corresponding to the -address is given to accumulation memory 24, and address is extracted corresponding to (i, j) that have $P^n(i, j)$ become the maximum or the minimum value by extractor 25 during the vertical synchronous term and outputted as moving vector. At this moment, timing such as read/write control signals from adder 23, accumulating and adding memory 24, and extractor 25 is controlled by time generator 20. Also this moving vector extractor 25 simultaneously extracts the maximum value, the minimum value and the mean value of the accumulated value, and outputs them. They are used as a parameter for judging the reliability of the moving vector extracted by such a microcomputer connected with the back step.

Here, two successive field images mean a combination of an odd field image and an even field image, or a combination of an even field image and an odd field image, and a moving vector is extracted from these combinations.

Instead of two successive field images, field images extracted from two successive frame images may also be used. In this case, since a combination can be taken of an odd field image and an odd field image, or an even field image and an even field image, the line interpolator 14 can be neglected.

Figure 12:
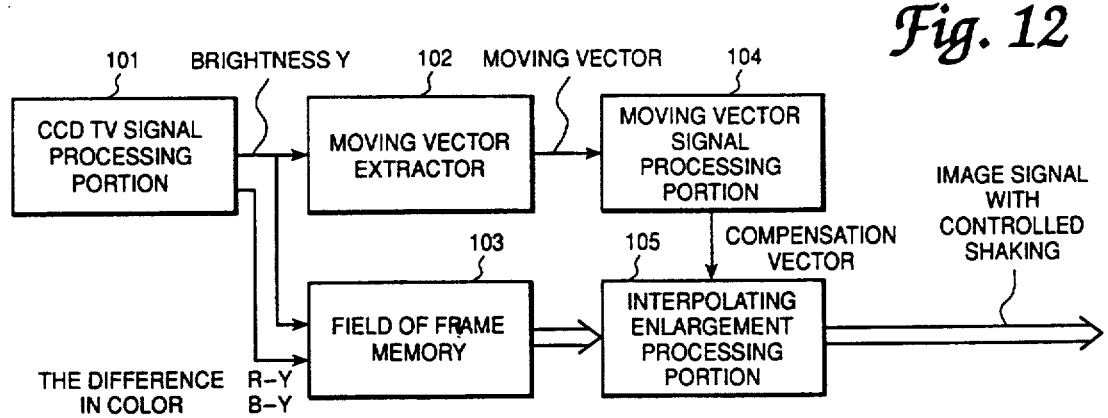
FIG. 12 shows a block diagram of the second embodiment of the present invention.

FIG. 12 describes the second embodiment of the present invention, and this is a compensation system for shaking of VTR with a camera incorporated therein which uses a moving vector extractor explained in the above first embodiment.

In this figure, 101 represents a CCD TV signal processing portion, 102 is a moving vector extractor, 103 is a field memory or frame memory for storing an image of the previous field or frame, 104 represents a moving vector signal processing portion which judges the reliability of a band filter for determining compensation frequency and of moving vector extraction, and 105 represents an interpolating enlargement processing portion which enlarges a part of an image with interpolation stored in a field memory or a frame memory.

A brightness signal outputted from CCD TV signal processing portion 101 is inputted into moving vector extractor 102, and a moving vector is extracted from an image signal of two successive fields or frames. On the other hand, the brightness signal and a signal of color difference R−Y and B−Y outputted from CCD TV signal processing portion 101 are stored in a field or frame memory 103, and are partially enlarged in interpolating enlargement processing portion 105 after the delay of one field or one frame. At this moment, the moving vector extracted by moving vector extractor 102 is inputted into a control terminal of interpolating enlargement processing portion 105 through moving vector signal processing portion 104, and it is compensated for the amount of the extracted moving vectors that are elements of shaking, in upper and lower, right and left sides by interpolating enlargement processing portion 105, and TV image signal, in which the shaking is controlled, is obtained.

Since an enlargement of a digital image is generally performed by magnifying power of an exponential of two, an image extracted from an input image is outputted, which is interpolated and enlarged twice.

Figure 13:
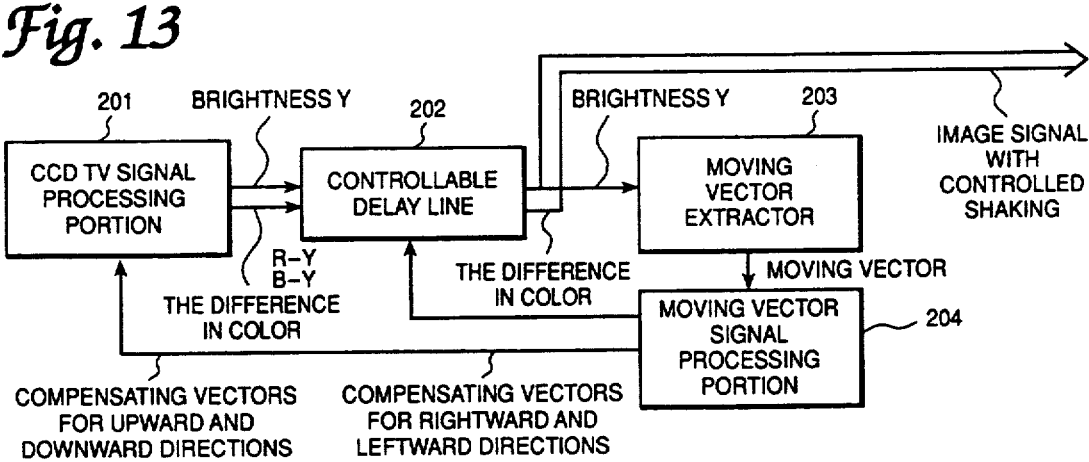
FIG. 13 shows a block diagram of the third embodiment of the present invention.

FIG. 13 shows the third embodiment of the present invention, and this is a compensation system for shaking of VTR with a camera incorporated therein, which uses a moving vector extractor explained in the above first embodiment.

CCD TV signal processing portion 201 controls the number of high speed output clocks accompanying vertical electric change translation, so the movement of an image upward, downward, rightward or leftward is also controllable by controllable delay 202. Brightness signal of an image outputted from CCD TV signal processing portion 201 is inputted into moving vector extractor 203 through controllable delay line 202, and a moving vector is extracted from image signal as well as in the operation of the second embodiment. The moving vector extracted is inputted into moving vector processing portion 204 and processing is performed there, in which the reliability is judged of a band filter for determining compensation frequency and of moving vector extraction. The compensating vectors for upward and downward directions are fed back to CCD TV signal processing portion 201, and compensating vectors for rightward and leftward directions are fed back to controllable delay line 202, and shaking is compensated through closed loop servo.

Figure 14:
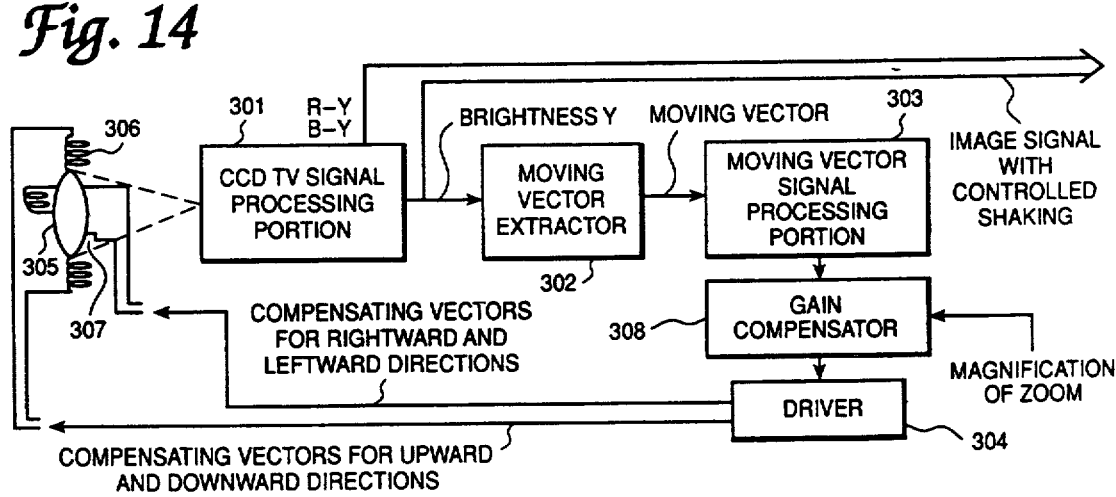
FIG. 14 shows a block diagram of the forth embodiment of the present invention.
Figure 15:
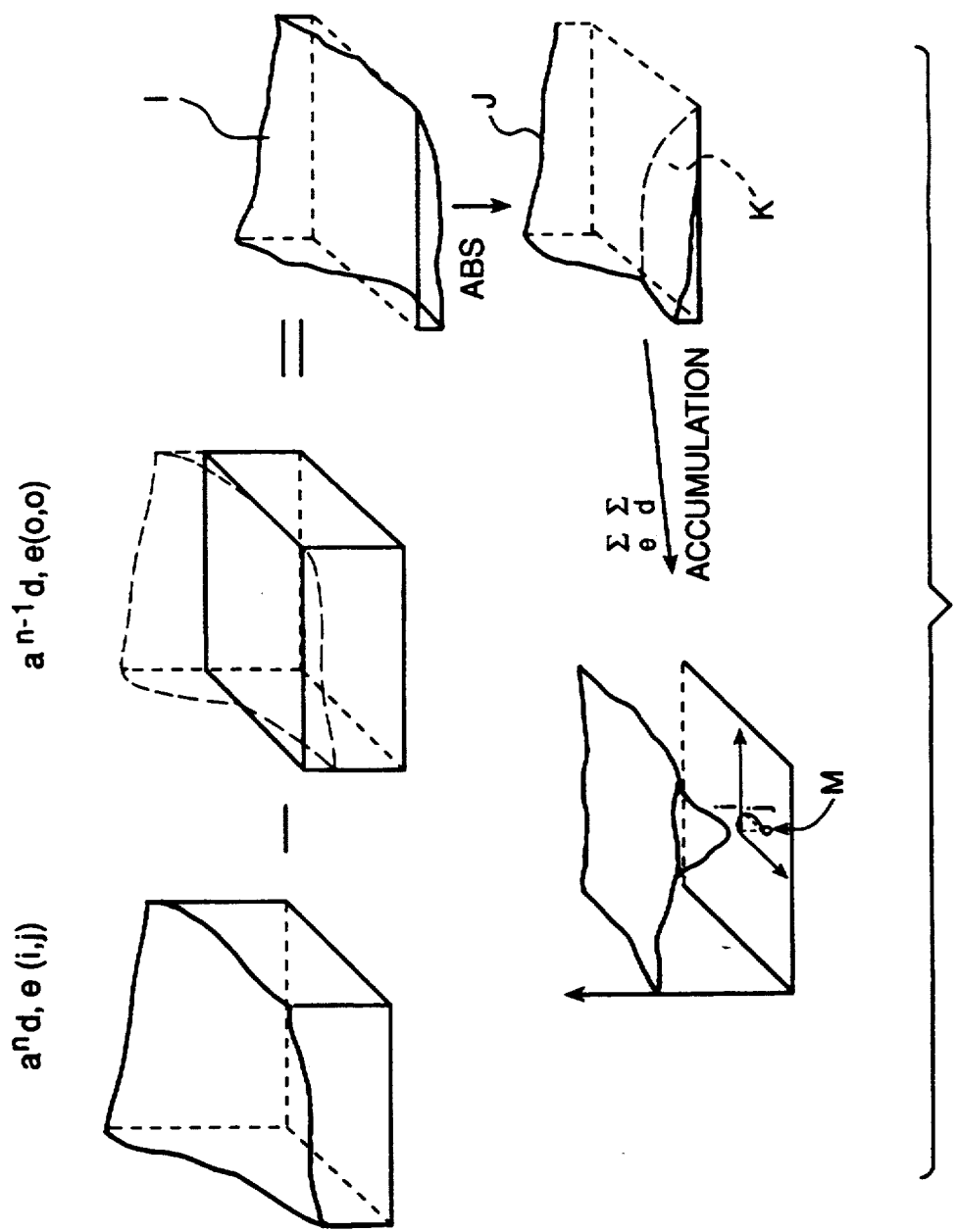
FIG. 15 shows a basic concept of representative point matching method.

FIG. 14 shows the fourth embodiment of the present invention, and this is a compensation system for the shaking of VTR with a camera incorporated therein, including a moving vector extractor explained in the above first embodiment.

301 represents CCD TV signal processing portion, 302 is a moving vector extractor, and a moving vector is extracted similarly to the operation of the second embodiment.

The extracted moving vector is inputted into moving vector processing portion 303 and processing is preformed, in which it is judged the reliability of a band filter for determining compensation frequency and of moving vector extraction. Lens 305 is supported by actuators 306 and 307 so as to be movable in two dimensions perpendicular to the optical axis of the lens. Lens 305 is moved in two dimensions by impressing compensation voltage to the actuators. Compensating vector outputted from moving vector signal processing portion 303 is amplified in driver 304 in the directions of up, down, right and leftward, and by impressing compensation voltage to actuator 306 and 307, the position of lens 305 is compensated. A feed-back loop for compensating movement of an image is constructed.

When a lens portion is provided with a zooming function, a loop gain of shaking compensation changes depending on the zoom magnification, therefore the zoom magnification information is inputted to gain compensator 308, and gain control is performed in inverse proportion to the zoom magnification.

In the embodiment above, an absolute value of the difference between frames is calculated. It is also possible to calculate the squared value of the difference value for obtaining the moving vector.

According to the present invention mentioned above, since a basic data of moving vector is weighted by density gradient value and accumulated, it is possible to reduce influence from random noises in an flat image which has small density gradient value. It improves the precision of moving vector extraction.

By means of this moving vector extractor, a moving extracting system is obtained for compensating shaking of VTR with a camera incorporated therein.

What is claimed is:

1. A moving vector extractor comprising:
   a timer generating a control signal having a predetermined timing;
   an image processor for receiving an input image signal which represents a physical image and for generating, responsive to said control signal, a plurality of brightness signals which represent said physical image at a plurality of successive image frames;
   a representative point memory for extracting and storing representative points from said brightness signals according to said control signal generated by said timer, said representative points having corresponding brightness values;
   subtracting means for calculating a difference between said brightness values of said stored representative points which are in proximate image frames;
   absolute value calculating means for calculating an absolute value of said difference calculated by said subtracting means;
   density gradient calculating means for calculating a density gradient in a neighborhood of said representative points;
   weighting means for weighting said absolute value of said difference according to said calculated density gradient;
   accumulating means for accumulating said absolute value of said weighted difference;
   an accumulation memory for storing two-dimensionally an accumulated result obtained by said accumulating means corresponding to said input image signal;
   a minimum value detecting means for detecting a minimum value from accumulated results stored in said accumulating means; and
   moving vector extracting means for extracting a moving vector based on said detected minimum value.

2. The moving vector extractor as claimed in claim 1, wherein said indicator value is an absolute value of said difference valve.

3. The moving vector extractor as claimed in claim 1, wherein said indicator valve is a squared value of said difference valve.

4. The moving vector extractor as claimed in claim 1, wherein said predetermined area is defined as a block area having a predetermined size, said predetermined size being obtained by dividing said frames into a number of subparts.

5. The moving vector extractor as claimed in claim 1, wherein said weighting means multiplies said indicator value by a weight of "0", when said density gradient value is less than a density gradient threshold value, and by a weight of "1", when said density gradient value is equal to or more than said density gradient threshold value.

6. The moving vector extractor as claimed in claim 1, wherein said density gradient value is obtained from an addition of a horizontal density gradient value and a vertical density gradient value surrounding each of said representative points.

7. The moving vector extractor as claimed in claim 6, wherein said horizontal and vertical density gradient values are calculated according to a Sobel operator.

8. The moving vector extractor as claimed in claim 6, wherein said horizontal and vertical density gradient values are calculated according to a Prewitt operator.

9. The moving vector extractor as claimed in claim 6, wherein said horizontal and vertical density gradient values are calculated according to a Robers operator.

10. The moving vector extractor as claimed in claim 1, wherein said density means comprises a multiplier for multiplying a density of a pixel by a multiplier which is changeable according to a control signal.

11. A video camera comprising;
    lens means for receiving an input image;
    moving vector extractor means for extracting a moving vector from said input image comprising:
    (a) difference means for calculating a difference value corresponding to brightnesses of representative points in successive frames of said input image, each of said representative points being in a predetermined area of each of said successive frames, said successive frames being a predetermined time period away from each other,
    (b) density means for calculating a density gradient value around each of said representative points,
    (c) indicating means for calculating an indicator value, said indicator value indicating said difference value as a positive value,
    (d) weighting means for weighting said indicator value according to said density gradient value, thereby generating a weighted indicator value, and
    (e) accumulating means for accumulating a summation of said weighted indicator value for each of said representative points and determining a local minimum in said summation, thereby extracting said moving vector from a positional relationship between said local minimum and said representative points;
    actuator means for moving said lens means in a horizontal and a vertical direction; and
    control means for controlling said movement of said actuator means in response to said moving vector extractor means.

12. A video camera as claimed in claim 11, further comprising;
    zoom means for changing a magnification of said lens means; and
    gain control means for changing a gain in said zoom means, said gain being controlled in reverse proportion to said magnification.

13. A moving vector extractor comprising:
    an image processor for electronically generating an image output signal representative of a physical image;
    image difference accumulation means for receiving said image output signal and for electronically generating signals, based on said image output signal, which are representative of time-varying differences of predetermined points in said physical image, said generated signals being responsive to local density gradients which correspond to said predetermined points; and vector determination means for identifying a moving vector according to successive signals from said image difference accumulation means.

14. The moving vector extractor of claim 13, said image difference accumulation means comprising:
means for calculating a difference between corresponding points in said image at successive points in time; and
means for adjusting said difference according to said local density gradient of said corresponding points.

15. The moving vector extractor of claim 14, said means for calculating comprising:
a memory for storing signals representative of said image at a given point in time; and
subtracting means for calculating a difference between a brightness value of a point in said representative point memory and a corresponding point of said image.

16. The moving vector extractor of claim 15, further comprising a timer for causing said memory to store signals representative of said image.

17. The moving vector extractor of claim 15, said subtracting means comprising absolute value calculating means for calculating an absolute value of said difference between a brightness value of a point in said representative point memory and said corresponding point of said image.

18. The moving vector extractor of claim 15, said subtracting means comprising squared value calculating means for calculating a square of said difference between a brightness value of a point in said representative point memory and said corresponding point of said image.

19. The moving vector extractor of claim 14, said means for adjusting comprising:
density gradient calculating means for calculating said local density gradient of said point;
weighting means for weighting an output of said difference calculating means according to a value of said density gradient calculated by said density gradient calculating means.

20. The moving vector extractor as claimed in claim 19, wherein said weighting means multiplies said indicator value by a weight of "0" when an output of said density gradient calculating means is less than a density gradient threshold value, and by a weight of "1", when said output of said density gradient calculating means is equal to or greater than said density gradient threshold value.

21. The moving vector extractor as claimed in claim 19, wherein said density gradient value is obtained from an addition of a horizontal density gradient value and a vertical density gradient value surrounding said point.

22. The moving vector extractor as claimed in claim 21, wherein said horizontal and vertical density gradient values are calculated according to a Sobel operator.

23. The moving vector extractor as claimed in claim 21, wherein said horizontal and vertical density gradient values are calculated according to a Prewitt operator.

24. The moving vector extractor as claimed in claim 21, wherein said horizontal and vertical density gradient values are calculated according to a Robers operator.

25. The moving vector extractor of claim 13, said vector determination means comprising:
accumulation means for accumulating successive signals from said image difference accumulation means; and
means for detecting a minimum value among signals in said accumulation means.

26. The moving vector extractor of claim 25, said accumulation means comprising:
an accumulation memory for storing a two-dimensional representation of signals in said image difference accumulation means.

27. A moving vector extractor comprising:
a timer generating a control signal at predetermined intervals;
an image processor for providing, responsive to said control signal, an image output signal representative of a physical image as an image frame, said output signal comprising a plurality of multi-valued portions, each multi-valued portion being representative of a point in said physical image;
difference means for calculating a difference value corresponding to the brightness of representative points in successive frames of an input image, each of said representative points being in a predetermined area of said image and being represented by one of said plurality of multi-valued portions of said image output signal;
density means for calculating a density gradient value around each of said representative points;
indicator means for calculating an indicator value, said indicator value being based on a positive representation of said difference value;
weighting means for weighting said indicator value according to said density gradient value, thereby generating a weighted indicator value;
accumulating means for accumulating a summation of weighted indicator values including said weighted indicator value for each representative point, for determining a local minimum in said summation and for providing an accumulator output signal indicative of said local minimum; and
means for generating a signal representing a moving vector from a positional relationship between said local minimum and said representative points.

28. The moving vector extractor as claimed in claim 27, wherein said predetermined area is defined as a block area having a predetermined size, said predetermined size being obtained by dividing said frames into a number of subparts.

29. The moving vector extractor as claimed in claim 27, wherein said weighting means multiplies said indicator value by a weight of "0", when said density gradient value is less than a density gradient threshold value and by a weight of "1", when said density gradient value is equal to or more than said density gradient threshold value.

30. The moving vector extractor as claimed in claim 27, wherein said density gradient value is obtained from an addition of a horizontal density gradient value and a vertical density gradient value surrounding each of said representative points.

31. The moving vector extractor as claimed in claim 30, wherein said horizontal and vertical density gradient values are calculated according to a Sobel operator.

32. The moving vector extractor as claimed in claim 30, wherein said horizontal and vertical density gradient values are calculated according to a Prewitt operator.

33. The moving vector extractor as claimed in claim 30, wherein said horizontal and vertical density gradient values are calculated according to a Robers operator.

34. The moving vector extractor as claimed in claim 27, wherein said density means comprises a multiplier for multiplying a density of a pixel by a multiplier which is changeable according to a control signal.

* * * * *